United States Patent
Savourey et al.

(10) Patent No.: US 12,473,629 B2
(45) Date of Patent: Nov. 18, 2025

(54) METHOD FOR PRODUCING A SUBSTOICHIOMETRIC LAYER OF TITANIUM, VANADIUM, TUNGSTEN OR MOLYBDENUM OXIDE

(71) Applicants: SOCIETE DES CERAMIQUES TECHNIQUES, Bazet (FR); UNIVERSITE PAUL SABATIER TOULOUSE III, Toulouse (FR); CENTRE NATIONAL DE LA RECHERCHE SCIENTIFIQUE (CNRS), Paris (FR)

(72) Inventors: Aimée Savourey, Leguevinleguevin (FR); Lionel Presmanes, Nailloux (FR); Yohann Thimont, Escalquens (FR); Antoine Barnabe, Baziège (FR)

(73) Assignees: SOCIETE DES CERAMIQUES TECHNIQUES, Bazet (FR); UNIVERSITE PAUL SABATIER TOULOUSE III, Toulouse (FR); CENTRE NATIONAL DE LA RECHERCHE SCIENTIFIQUE (CNRS), Paris (FR)

(*) Notice: Subject to any disclaimer, the term of this patent is extended or adjusted under 35 U.S.C. 154(b) by 0 days.

(21) Appl. No.: 18/722,727

(22) PCT Filed: Dec. 20, 2022

(86) PCT No.: PCT/FR2022/052444
§ 371 (c)(1),
(2) Date: Jun. 21, 2024

(87) PCT Pub. No.: WO2023/118734
PCT Pub. Date: Jun. 29, 2023

(65) Prior Publication Data
US 2025/0051906 A1   Feb. 13, 2025

(30) Foreign Application Priority Data

Dec. 21, 2021 (FR) .................. FR2114064

(51) Int. Cl.
*C23C 14/35* (2006.01)
*C23C 14/08* (2006.01)
(Continued)

(52) U.S. Cl.
CPC .......... *C23C 14/35* (2013.01); *C23C 14/083* (2013.01); *C23C 14/3414* (2013.01);
(Continued)

(58) Field of Classification Search
None
See application file for complete search history.

(56) References Cited

U.S. PATENT DOCUMENTS 6,210,545 B1 * 4/2001 Farooq .................. C04B 35/49
427/78
9,340,866 B2   5/2016 Ritchie
2020/0044152 A1   2/2020 Yu

FOREIGN PATENT DOCUMENTS

EP   1633902 A2   3/2006
EP   1633902 B1   12/2012
(Continued)

OTHER PUBLICATIONS

PCT International Search Report in co-pending PCT Application No. PCT/FR2022/052444, mailed Mar. 29, 2023.
(Continued)

*Primary Examiner* — Jason Berman
(74) *Attorney, Agent, or Firm* — Thomas | Horstemeyer, LLP

(57) ABSTRACT

The present invention relates to a method for producing a substoichiometric oxygen layer from titanium, vanadium,
(Continued)

tungsten or molybdenum oxide on a substrate by magnetron sputtering a target in a chamber, the method being characterised in that the target consists of titanium, vanadium, tungsten or molybdenum oxide and in that it comprises the steps of: a) creating a vacuum in the chamber and adding an inert gas to same; b) simultaneously applying a first radiofrequency potential to the target and a second radiofrequency potential to the substrate so as to generate, in the chamber, a plasma that is suitable for simultaneously i) sputtering the target to deposit a layer of the titanium, vanadium, tungsten or molybdenum oxide on the substrate; and ii) sputtering the layer of titanium, vanadium, tungsten or molybdenum oxide deposited on the substrate to remove oxygen atoms from the layer.

5 Claims, 4 Drawing Sheets

(51) Int. Cl.
  C23C 14/34  (2006.01)
  C23C 14/50  (2006.01)
  C23C 14/54  (2006.01)

(52) U.S. Cl.
  CPC ............ *C23C 14/345* (2013.01); *C23C 14/50* (2013.01); *C23C 14/548* (2013.01)

(56) References Cited

FOREIGN PATENT DOCUMENTS

KR  20120043163  3/2012
WO  2004106582 A2  12/2004

OTHER PUBLICATIONS

French Search Report in co-pending French Application No. 903693, mailed Jul. 20, 2022.
Sawsen Nezar, et al., "Properties of TiO2 thin films deposited by rf reactive magnetron sputting on biased substrates", Applied Surface Science, vol. 395, 2017, pp. 172-179.

* cited by examiner

METHOD FOR PRODUCING A SUBSTOICHIOMETRIC LAYER OF TITANIUM, VANADIUM, TUNGSTEN OR MOLYBDENUM OXIDE

CROSS REFERENCE TO RELATED APPLICATIONS

This application is the 35 U.S.C. § 371 national stage application of PCT Application No. PCT/FR2022/052444, filed Dec. 20, 2022, which application claims the benefit of French Application No. FR 2114064 filed Dec. 21, 2021, both of which are hereby incorporated by reference herein in their entireties.

GENERAL TECHNICAL FIELD

The present invention concerns the field of (oxygen-)substoichiometric materials and magnetron sputtering.

More precisely, the present invention concerns the production of a (oxygen-)substoichiometric layer from titanium, vanadium, tungsten or molybdenum oxide by magnetron sputtering.

STATE OF THE ART (Oxygen-)substoichiometric materials of various oxides such as titanium, vanadium, tungsten or molybdenum oxides have advantageous particular characteristics. Indeed, some of these materials, which are called Magneli phases, are very resistant and electrically conductive and are very useful for making electric batteries. For example, titanium Magneli phases have been marketed under the name Ebonex® by the English company Atraverda Ltd for the manufacture of electrodes in batteries. The choice to use titanium Magneli phases is justified both by their robustness in aggressive basic or acidic environments and by their good electrical conductivity. Ebonex® titanium Magneli phases have been demonstrated to be resistant for 50 years in 4 mol/dm$^3$ H$_2$SO$_4$ at room temperature. The resistance and conductivity of these materials were explained by the scientist Arne Magneli, who discovered Magneli phases in 1954. The particular characteristics of Magneli phases are due to a deformation called shear, the shear itself being due to a lack of oxygen atoms in the crystal structure.

Magneli phases have a precise chemical formula, in which the ratio between the number of oxygen atoms and the number of metal atoms (i.e., titanium, vanadium, tungsten, molybdenum) from one Magneli phase to another remains very close. For example, titanium Magneli phases have the formula Ti$_n$O$_{2n-1}$ with n being comprised between 4 and 9 inclusive. The chemical formulas of the titanium Magneli phases are therefore Ti$_4$O$_7$, Ti$_5$O$_9$, Ti$_6$O$_{11}$, etc. Thus, the O/Ti ratios between the first phase, i.e., 1.75 for Ti$_4$O$_7$, and the last phase, i.e., 1.89 for Ti$_9$O$_{17}$, are very close. It will be understood here that, in order to obtain Magneli phases, it is necessary to be able to control very precisely the underoxidation of titanium, vanadium, tungsten or molybdenum oxides.

Currently, there are only three ways to obtain materials of the same composition as Magneli phases, which are therefore special (oxygen-)substoichiometric materials.

The first way is to heat titanium, vanadium, tungsten or molybdenum powders with, respectively, titanium, vanadium, tungsten or molybdenum oxide powders under an inert atmosphere.

The second way is to reduce titanium, vanadium, tungsten or molybdenum oxide at high temperature, for example at more than 1273 Kelvin for titanium oxide, under a reducing atmosphere, for example under a hydrogen atmosphere.

In these first two cases, it is necessary to heat the materials to high temperatures, which requires a great deal of energy.

The third way consists of sputtering a titanium target by magnetron sputtering under an atmosphere of argon and molecular oxygen so that the titanium becomes enriched with oxygen. In this case, where the atmosphere contains oxygen, the target oxidizes. Consequently, oxidized molecules of the target are sputtered, in addition to sputtering the titanium atoms of the target. It is then very difficult to control the process and to ensure that Magneli phases are actually obtained.

The present invention improves the situation.

PRESENTATION OF THE INVENTION

The invention proposes a method for producing a (oxygen-)substoichiometric layer of titanium, vanadium, tungsten or molybdenum oxide which is more energy efficient and easier to control.

The present invention thus relates, according to a first aspect, to a method for producing a (oxygen-)substoichiometric layer of titanium, vanadium, tungsten or molybdenum oxide on a substrate by magnetron sputtering of a target in a chamber, said method being characterized in that said target is made of said titanium, vanadium, tungsten or molybdenum oxide and in that it comprises the steps of:
  a) creating a vacuum in the chamber and introducing an inert gas,
  b) simultaneously applying a first radiofrequency potential to the target and a second radiofrequency potential to the substrate, so as to generate, in the chamber, a plasma suitable for simultaneously
  i) sputtering the target to deposit a layer of said titanium, vanadium, tungsten or molybdenum oxide on the substrate, and
  ii) sputtering said layer of titanium, vanadium, tungsten or molybdenum oxide deposited on the substrate to remove oxygen atoms from said layer.

According to advantageous and non-limiting characteristics:
The inert gas introduced into the chamber is argon.
The substrate is a ceramic substrate.
A ratio of a density of the second radiofrequency potential to a density of the first radiofrequency potential is greater than a potential density ratio threshold.
The potential density ratio threshold is greater than 0.2.
The substrate is supported by a substrate carrier, the second radiofrequency potential is applied to the substrate carrier, and the density of the second radiofrequency potential corresponds to the second radiofrequency potential applied to the substrate carrier per unit of surface area of the substrate carrier.

A system for implementing a method for producing a (oxygen-)substoichiometric layer of titanium, vanadium, tungsten or molybdenum oxide on a substrate by magnetron sputtering of a target made of said titanium, vanadium, tungsten or molybdenum oxide comprises:
  a chamber connected to a vacuum apparatus, the chamber being capable of being placed under vacuum by means of the vacuum apparatus, the chamber being connected to an inert gas source configured to introduce inert gas into the chamber, at least one first radiofrequency source adapted to be connected to the target, the first radiofrequency source being configured to apply a first radiofrequency potential to the target, at least one second radiofrequency source adapted to be connected to the substrate, the second radiofrequency source being configured to apply a second radiofrequency potential to the substrate.

PRESENTATION OF THE FIGURES

Other characteristics and advantages of the present invention will become apparent upon reading the following description of a preferred embodiment. This description will be given with reference to the attached figures, in which:

FIG. 1 schematically shows a system for producing a (oxygen-)substoichiometric layer of titanium, vanadium, tungsten or molybdenum oxide according to one possible embodiment of the invention;

Figure 4:
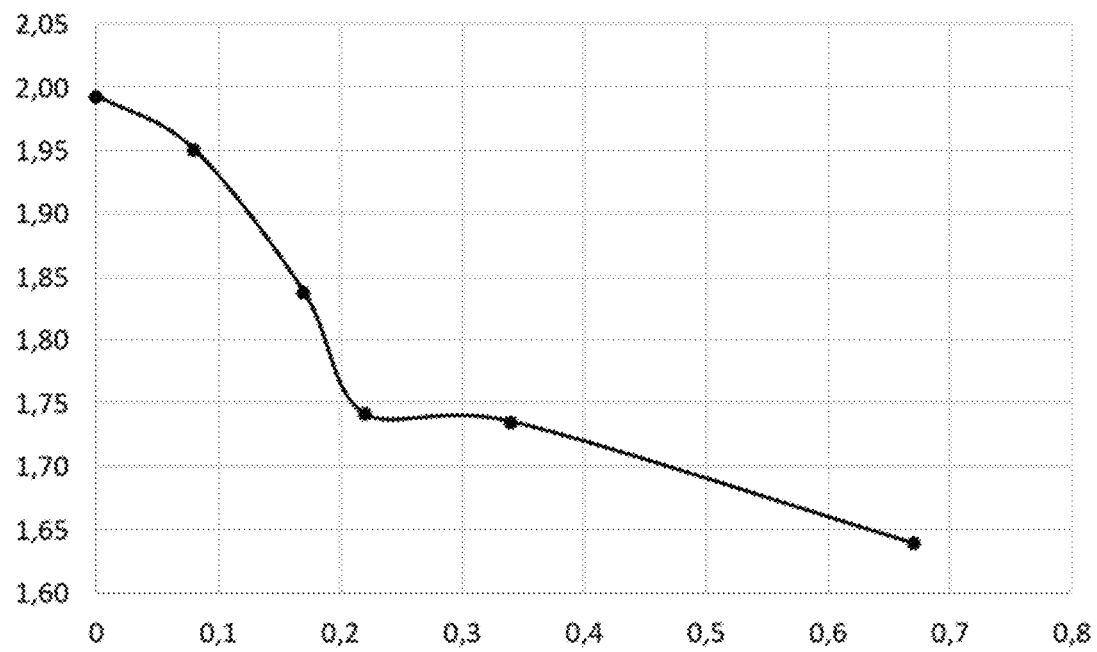
Figure 5:
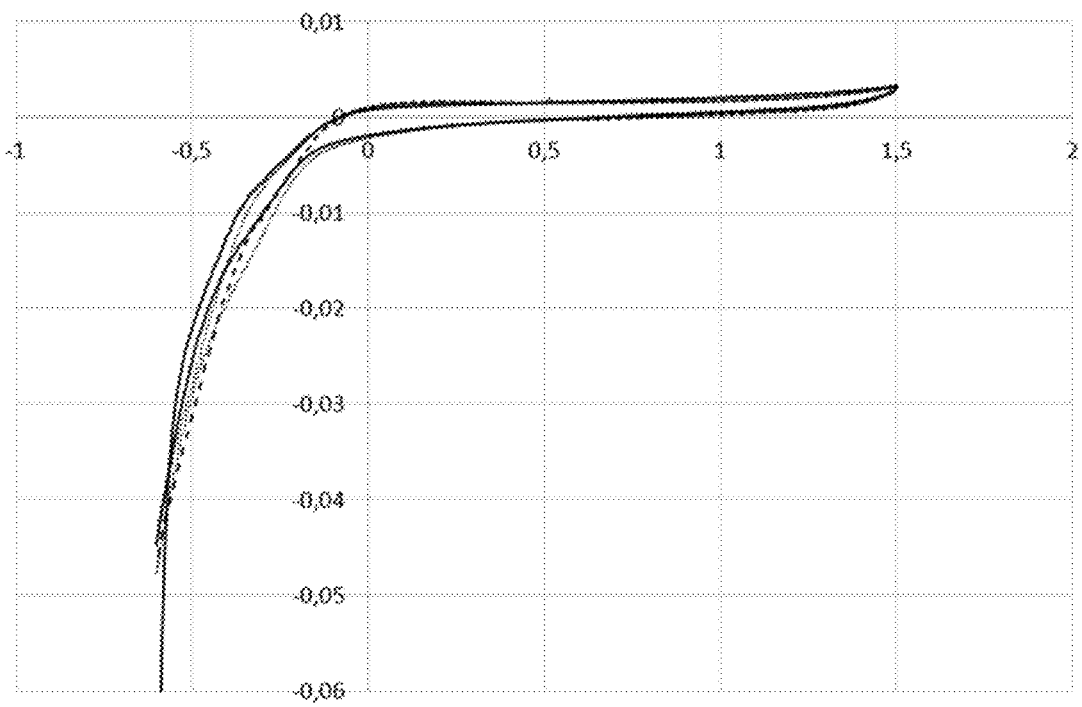
Figure 6:
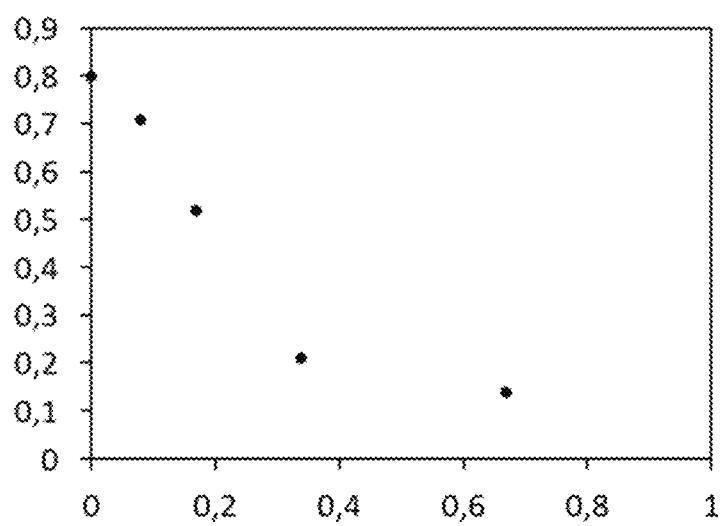

FIG. 4 is a graph of the ratio of the number of oxygen atoms to the number of titanium atoms in a (oxygen-)substoichiometric layer of titanium oxide as a function of the ratio of the potential density applied to the substrate carrier to the potential density applied to the target according to one possible embodiment of the invention, FIG. 5 is a graph showing the evolution of the electric current as a function of the potential difference between a working electrode composed of the material of a (oxygen-)substoichiometric layer of titanium oxide obtained by the method according to one embodiment and a saturated calomel reference electrode during three voltammetry cycles, FIG. 6 shows the evolution of the mean transmittance in the visible range of the material of a (oxygen-)substoichiometric layer of titanium oxide obtained by the claimed method as a function of the ratio of the potential density applied to the substrate carrier to the potential density applied to the target according to one possible embodiment of the invention.

DETAILED DESCRIPTION

System

Figure 1:
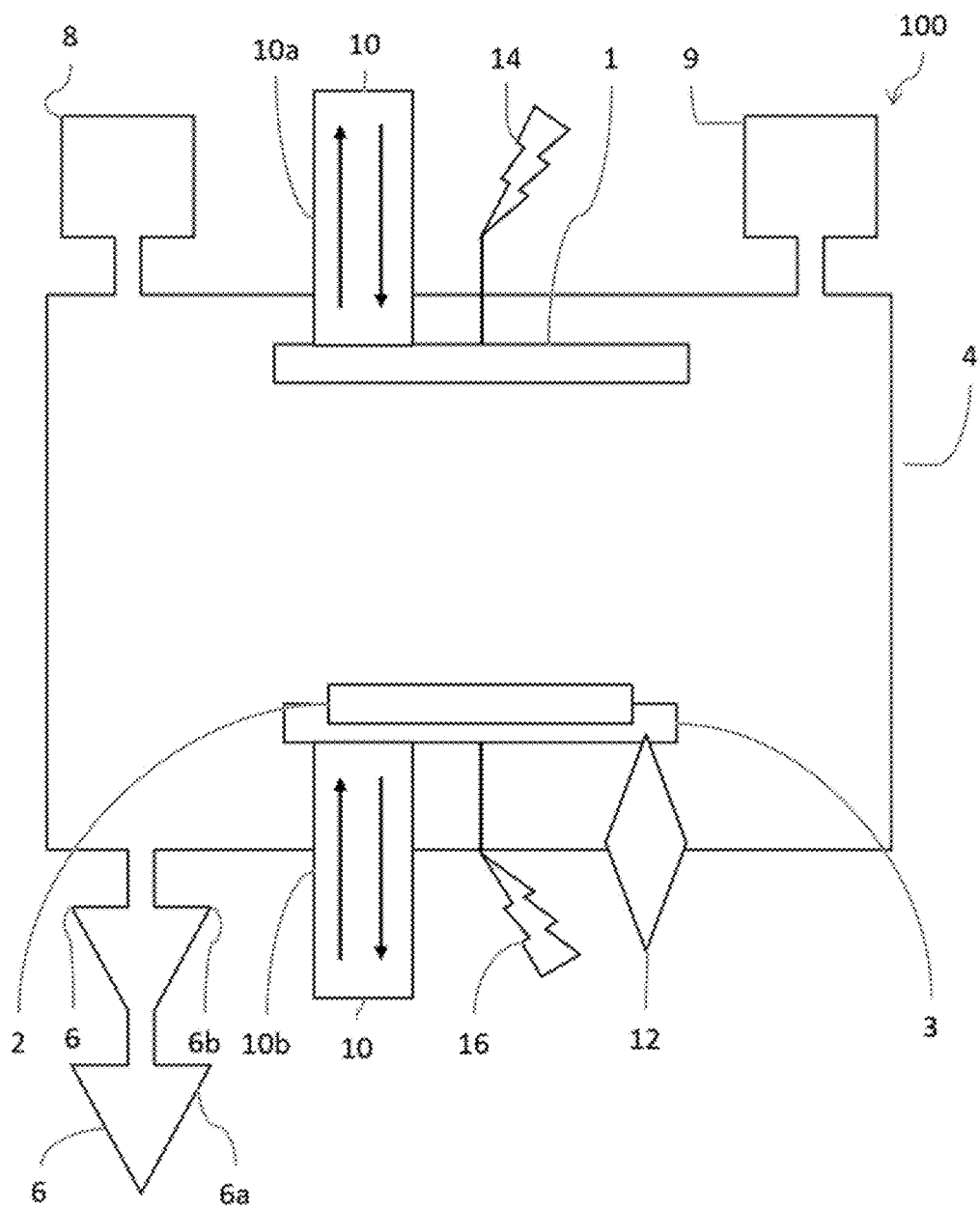

FIG. 1 schematically shows a system 100 for implementing a method for producing a (oxygen-)substoichiometric layer of titanium, vanadium, tungsten or molybdenum oxide on a substrate 2 by magnetron sputtering of a target 1 in a chamber. Magnetron sputtering consists of using the energy of a plasma, i.e., a partially ionized gas, on the surface of a target 1, i.e., the cathode, to remove atoms from the material of the target 1 one by one and deposit them on a substrate 2, i.e., the anode.

In order to implement the method for producing a (oxygen-)substoichiometric layer of an oxide, the magnetron sputtering system 100 comprises a chamber 4 connected to a vacuum apparatus 6. The chamber 4 is, for example, a structure that can be opened and closed and, when it is closed, is airtight. The vacuum apparatus 6 connected to the chamber 4 is configured to create a vacuum in the chamber 4. Preferably, the vacuum apparatus 6 makes it possible to create a vacuum in the chamber 4 of the ultrahigh type, i.e., the residual air pressure in the chamber 4 is less than $10^{-6}$ mbar. More preferably, the chamber 4 is connected to two vacuum apparatuses 6a, 6b comprising a first vacuum apparatus 6a and a second vacuum apparatus 6b. The first vacuum apparatus 6a is configured to apply a primary vacuum to the chamber 4, i.e., the residual air pressure in the chamber 4 is between 1 mbar and $10^{-2}$ mbar. The first vacuum apparatus 6a is, for example, a primary oil pump. The second vacuum apparatus 6b is configured to apply an ultrahigh vacuum in the chamber 4, once the primary vacuum has been applied. The second vacuum apparatus 6b is, for example, a turbomolecular pump.

The chamber 4 is also connected to an inert gas source 8 configured to introduce inert gas into the chamber 4. The inert gas delivered by the inert gas source 8 is, for example, argon, neon or krypton. Preferably, the inert gas delivered by the inert gas source 8 is argon. The inert gas source 8 is typically an inert gas cylinder. The inert gas flow rate at which the inert gas is introduced into chamber 4 may be measured with a flow meter so that the flow rate can be monitored.

Preferably, the chamber 4 is connected to a second gas source 9 to increase the pressure in the chamber 4 until atmospheric pressure is reached so that the chamber 4 is no longer under vacuum. Preferably, the gas delivered by the second gas source 9 is nitrogen or air.

The substrate 2 and the target 1 are disposed in the chamber 4. The substrate 2 is preferably supported by a substrate carrier 3. Preferably, the target 1 has a thickness comprised between 3 mm and 10 mm. Typically, the target 1 is larger than the substrate 2. For example, the target 1 can be a circular plate of 10 cm in diameter and 3 mm in thickness, while the substrate 2 is a square plate of 25 mm per side and 1 mm in thickness.

The target 1 is made of titanium, vanadium, tungsten or molybdenum oxide. For example, the target 1 consists of titanium dioxide, $TiO_2$.

The substrate 2 is made of a ceramic or metal material. Ceramic materials have the advantage of being very resistant to wear. Alternatively, the substrate 2 may be made of silicon.

Preferably, the system 100 comprises cooling systems 10a, 10b for respectively cooling the target 1 and the substrate 2. The cooling systems 10a, 10b are, for example, cold water circuits circulating close to the target 1 and the substrate 2 to cool them. In fact, during the magnetron cathode sputtering process, the target 1 and the substrate 2 are heated and it is necessary to cool them. In particular, it is necessary to be able to cool the target 1 because, when the target 1 is bombarded, it can heat to the point of cracking.

Advantageously, the system 100 comprises a heating system 12 configured to heat the substrate 2. Heating the substrate 2 allows a better crystallization of the (oxygen-)substoichiometric layer of oxide that will be formed on the substrate 2.

The system 100 comprises at least one first radiofrequency source 14 adapted to be connected to the target 1, the first radiofrequency source 14 being configured to apply a first radiofrequency potential to the target 1. The first radiofrequency source 14 is typically a radiofrequency generator.

The system 100 comprises at least one second radiofrequency source 16 adapted to be connected to the substrate 2, the second radiofrequency source 16 being configured to apply a second radiofrequency potential to the substrate 2. The second radiofrequency source 16 is typically a radiofrequency generator. In a certain embodiment, the substrate 2 is fixed to a substrate carrier 3 and the second radiofrequency source 16 is connected to the substrate carrier 3. The second radiofrequency source 16 is therefore connected to the substrate 2 via the substrate carrier 3 and is configured to apply a second radiofrequency potential to the substrate 2 via the substrate carrier 3.

The first radiofrequency source 14 and the second radiofrequency source 16 are typically radiofrequency generators generating waves with a frequency of 13.56 kHz. The first radiofrequency source 14 and the second radiofrequency source 16 may also be microwave systems generating waves of a frequency of a few MHz.

Method

Figure 2:
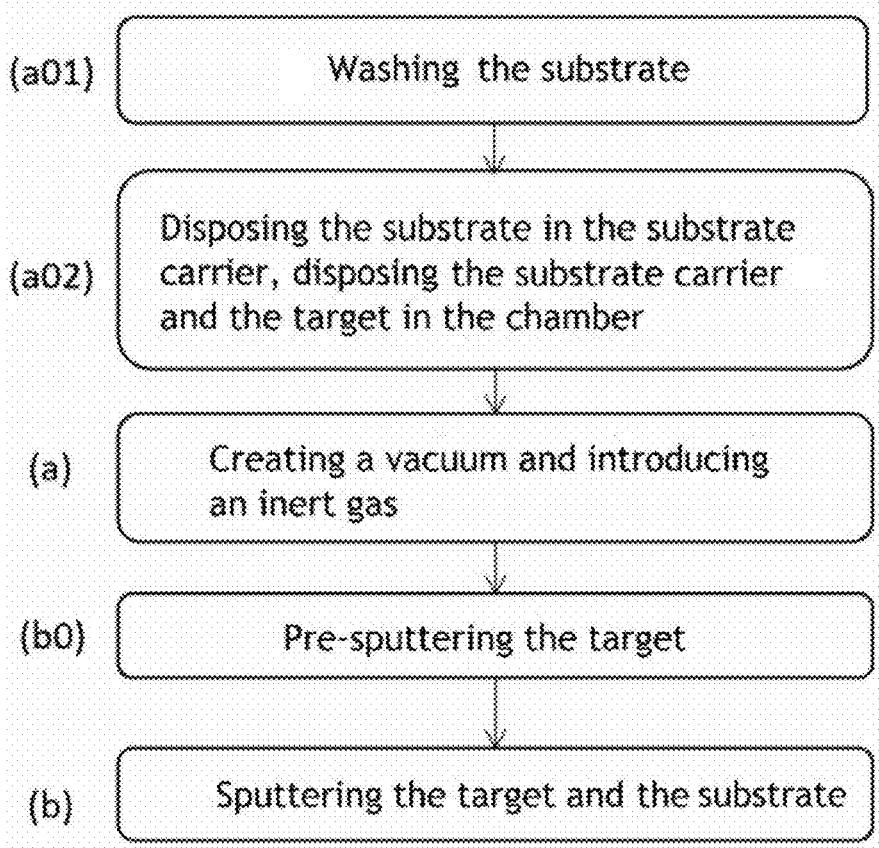
FIG. 2 shows the steps of a method for producing a (oxygen-)substoichiometric layer of titanium, vanadium, tungsten or molybdenum oxide according to one possible embodiment of the invention.

In reference to FIG. 2, the invention concerns a method for producing a (oxygen-)substoichiometric layer of titanium, vanadium, tungsten or molybdenum oxide on a substrate 2 by magnetron sputtering of a target 1 in a chamber 4.

In a prior step a01), which is carried out outside the chamber 4, the substrate 2 is washed and then dried. For example, substrate 2 can be washed with acetone and then ethanol in ultrasonic tanks and then dried with a jet of nitrogen.

Then, in a prior step a02), the substrate 2 is fixed to a substrate carrier 3 and the substrate carrier 3 is disposed in the chamber 4 and the substrate 2 (or the substrate carrier 3) is connected to the second radiofrequency source 16. In addition, the target 1 is disposed in the chamber 4 and is connected to the first radiofrequency source 14.

In a step a), the chamber 4 is evacuated by means of the vacuum apparatus 6 and an inert gas is introduced into the chamber 4. The vacuum can be implemented in two phases: a first primary vacuum phase by the first vacuum apparatus 6a and a second ultrahigh vacuum phase by the second vacuum apparatus 6b.

The inert gas is then introduced into the chamber 4 by means of the inert gas source 8. Only an inert gas is introduced into the chamber 4 rather than a reactive gas, as a gaseous mixture of molecular oxygen and argon would be. In fact, if the gas introduced comprised oxygen, the target 1 would oxidize and the method for producing a (oxygen-)substoichiometric layer would be difficult to control. Preferably, the gas introduced is argon.

In a step b0), the target 1 is pre-sputtered to clean it of any residues, for example water residues. Thus, a radiofrequency potential (hereinafter called the third radiofrequency potential) is applied to the target 1 by the first radiofrequency source 14. Consequently, the inert gas atoms in the chamber 4 are ionized and these ions bombard the target 1 which is thus sputtered and cleaned. During this pre-sputtering, a mask is disposed on the substrate 2 so that it is not impacted by atoms of the inert gas or atoms removed from the target 1.

Still in reference to FIG. 2, in a step b), a first radiofrequency potential is applied to the target 1 by the first radiofrequency source 14 and, simultaneously, a second radiofrequency potential is applied to the substrate 2 by the second radiofrequency source 16. Consequently, a plasma is generated in the chamber 4 which simultaneously sputters the target 1 to deposit a layer of titanium, vanadium, tungsten or molybdenum oxide on the substrate 2, and sputters the layer of titanium, vanadium, tungsten or molybdenum oxide deposited on the substrate 2 to extract oxygen atoms from the layer.

More precisely, when the first radiofrequency potential is applied to the target 1, atoms of the inert gas are ionized and these ions bombard the target 1. As a result, atoms of the target 1, i.e., atoms constituting titanium, vanadium, tungsten or molybdenum oxide, are removed from the target 1 and deposited on the substrate 2, thus forming a layer of titanium, vanadium, tungsten or molybdenum oxide on the substrate 2. The first radiofrequency potential may be equal to the third radiofrequency potential.

Simultaneously, when the second radiofrequency potential is applied to the substrate 2, ions coming from the atoms of the inert gas are attracted by the substrate 2 and thus bombard the substrate 2. Thus, during the deposition of the oxide on the substrate 2, ions from the atoms of the inert gas bombard the oxide layer deposited and growing on the substrate 2. Consequently, oxygen atoms from the oxide layer deposited on the substrate 2 are removed from the substrate 2, which means that the oxide layer deposited on the substrate 2 suffers a loss of oxygen atom, thus forming a (oxygen-)substoichiometric layer of titanium, vanadium, tungsten or molybdenum oxide on the substrate 2. Since metal atoms (i.e., titanium, vanadium, tungsten or molybdenum) are heavier than oxygen atoms, bombardment of the oxide layer in the growth phase by ions from the inert gas atoms will promote the depletion of oxygen in the oxide layer. This will create local defects which are especially the sites where oxygen is absent. This explains the formation of substoichiometric oxide layers. The removed oxygen atoms are then pumped out of the chamber.

Advantageously, the ratio of a density of the second radiofrequency potential to a density of the first radiofrequency potential is greater than a potential density ratio threshold. The radiofrequency potential density corresponds to the radiofrequency potential applied per unit of surface area. For example, the density of the first radiofrequency potential corresponds to the radiofrequency potential applied to the target 1 per unit of surface area of the target 1. The radiofrequency potential density can be expressed in $W/cm^2$.

Preferably, the density of the second radiofrequency potential corresponds to the radiofrequency potential applied to the substrate carrier 3 per unit of surface area of the substrate carrier 3.

Figure 3:
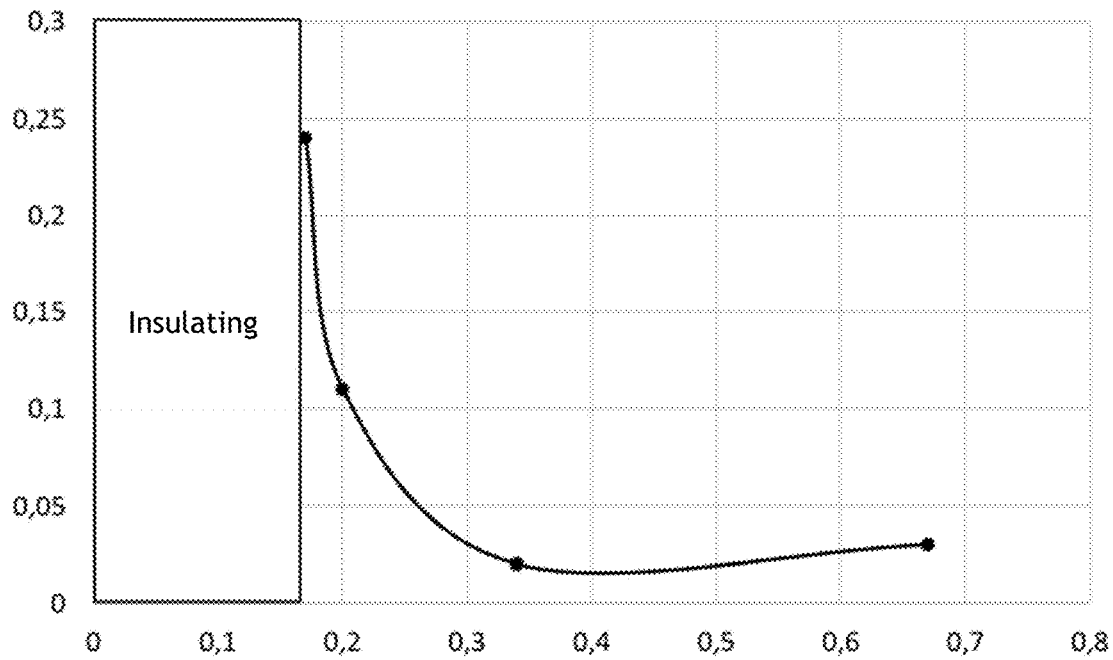
FIG. 3 is a graph of the electrical resistivity of a (oxygen-)substoichiometric layer of titanium oxide as a function of the ratio of the potential density applied to the substrate carrier to the potential density applied to the target according to one possible embodiment of the invention.

As illustrated in FIG. 3, from a certain threshold of potential density ratio, the (oxygen-)substoichiometric layer of titanium, vanadium, tungsten or molybdenum oxide formed on the substrate 2 is electrically conductive. FIG. 3 is a graph plotting the electrical resistivity of the (oxygen-)substoichiometric layer of titanium oxide formed on substrate 2 as a function of the ratio of the density of the second radiofrequency potential to the density of the first radiofrequency potential, measured at room temperature (21° C.). The electrical resistivity is expressed in Ohm*cm. It can be noted that, starting from a potential density ratio of 0.2, the electrical resistivity of the layer formed on the substrate 2 is low compared to the electrical resistivity of the layer for a potential density ratio comprised between 0 and 0.2. This is due to oxygen substoichiometry. In fact, from a certain threshold of potential density ratio, the ratio of the number of atoms of titanium, vanadium, tungsten or molybdenum to the number of oxygen atoms present in the substoichiometric layer formed on the substrate 2 is low so that the electrical resistivity of the layer is low. Low electrical resistivity is understood to mean an electrical resistivity of less than 0.11 Ohm*cm.

FIG. 4 is a graph of the ratio of the number of oxygen atoms to the number of titanium atoms in a (oxygen-)substoichiometric layer of titanium oxide formed on substrate 2 in the context of this method, the O/Ti ratio, based on the ratio of the density of the second radiofrequency potential to the density of the first radiofrequency potential. The measurements were carried out by microprobe.

It can be noted that from a potential density ratio of 0.2, the O/Ti ratio is low compared to the O/Ti ratio for a potential density ratio comprised between 0 and 0.2.

Advantageously, the potential density ratio threshold is greater than 0.2. In fact, from this threshold of 0.2, the electrical resistivity of the (oxygen-)substoichiometric layer of titanium, vanadium, tungsten or molybdenum oxide formed on the substrate 2 is less than 0.11 Ohm*cm.

During the simultaneous sputtering of the target 1 and of the substrate 2, cooling circuits 10a and 10b respectively allow the target 1 and the substrate 2 to be cooled.

The simultaneous sputtering of the target 1 and of the substrate 2 is carried out for a certain sputtering time. Once this sputtering time has elapsed, the first radiofrequency source 14 and the second radiofrequency source 16 are shut off so that no radiofrequency potential is applied to the target 1 and to the substrate 2. Then, a gas is introduced into the chamber 4 by the second gas source 9 to increase the pressure in the chamber 4. Once the pressure in the chamber 4 reaches atmospheric pressure, the chamber 4 is opened and the substrate 2 is extracted from the chamber 4.

In the same system, i.e., especially with the same chamber and the same means of application of the first and second radiofrequency potentials, it is possible to vary the stoichiometry of the oxide layer formed on the substrate especially by varying the ratio of the density of the second radiofrequency potential to the density of the first radiofrequency potential. Also, for example, it is possible to vary other parameters such as pressure, which will also require varying the ratio of the density of the second radiofrequency potential to the density of the first radiofrequency potential.

The experimental results show that the material obtained is indeed a (oxygen-)substoichiometric oxide whose composition is identical to the composition of Magneli phases. Tests were carried out on a (oxygen-)substoichiometric layer of a titanium oxide obtained by the present method. First, X-ray diffraction tests do not show the presence of metallic titanium. In addition, cross-sectional observations by scanning electron microscopy and transmission microscopy were carried out and no metallic titanium atoms were observed, which proves that the layer is indeed composed of a substoichiometric oxide.

The experimental results concerning the properties of the layer obtained also confirm that the layer obtained has the same properties as Magneli phases. First of all, the resulting material is highly conductive of electricity, as illustrated in FIG. 2. Moreover, the material obtained has a very good oxidation resistance under acidic pH conditions. FIG. 5 shows the result of three voltammetry cycles applied to the material obtained. A working electrode (composed of the material obtained) and a saturated calomel reference electrode (SCE) were immersed in sulfuric acid ($H_2SO_4$ solution with concentration 1.7 mol/L) and a potential was applied to the working electrode. FIG. 5 shows curves plotting the electrical current in mA flowing between the two electrodes as a function of the potential difference between the two electrodes V/SCE in volts. Three cycles are shown (first cycle by a solid line, second cycle by a dotted line, and third cycle by a broken line). There is a reduction in water at −0.6 V, which shows that the working electrode is electrically conductive. It is also noted that the corrosion current is almost zero up to a potential difference of 1.5 V in oxidation (positive voltage). The superposition of the three cycles shows the absence of oxidation of the substoichiometric oxide layer as well as the electrochemical stability of the substoichiometric oxide layer over time.

Finally, FIG. 6 shows the evolution of the mean transmittance in the visible range (wavelength between 400 nm and 800 nm) of the material obtained as a function of the potential density ratio. From a certain potential density ratio, the transmittance is low (less than 0.25, i.e. less than 25%), compared to $TiO_2$ which has a very high transmittance, of around 0.8. This property is similar to Magneli phase composition materials.

The invention is not limited to the embodiment described and shown in the attached figures. Modifications remain possible, especially from the point of view of the constitution of the various technical characteristics or by substitution of technical equivalents, without thereby exceeding the scope of protection of the invention.

The invention claimed is:

1. A method for producing a substoichiometric layer of an oxide of titanium, vanadium, tungsten or molybdenum on a substrate by magnetron sputtering of a target in a chamber,
   wherein the target is made of the oxide of titanium, vanadium, tungsten or molybdenum,
   and wherein the oxide of titanium, vanadium, tungsten or molybdenum is only made of oxygen atoms and of titanium, vanadium, tungsten or molybdenum atoms respectively, the method comprising:
   a) creating a vacuum in chamber and introducing an inert gas,
   b) simultaneously applying a first radiofrequency potential to the target and a second radiofrequency potential to the substrate, so as to generate, in the chamber, a plasma suitable for simultaneously
      i) sputtering the target to deposit a layer of the oxide of titanium, vanadium, tungsten or molybdenum on the substrate, and
      ii) sputtering the layer of the oxide of titanium, vanadium, tungsten or molybdenum deposited on the substrate to remove oxygen atoms from said layer.

2. The method of claim 1, wherein the inert gas introduced into the chamber is argon.

3. The method of claim 1, wherein the substrate is a ceramic substrate.

4. The method of claim 1, wherein a ratio of a power density of the second radiofrequency potential to a power density of the first radiofrequency potential is greater than a power density ratio threshold,
   wherein the power density ratio threshold is greater than 0.2.

5. The method of claim 4, wherein the substrate is supported by a substrate carrier, the second radiofrequency potential is applied to the substrate carrier, and the power density of the second radiofrequency potential corresponds to the power of the second radiofrequency potential applied to the substrate carrier per unit of surface area of the substrate carrier.

* * * * *